Figure 15:
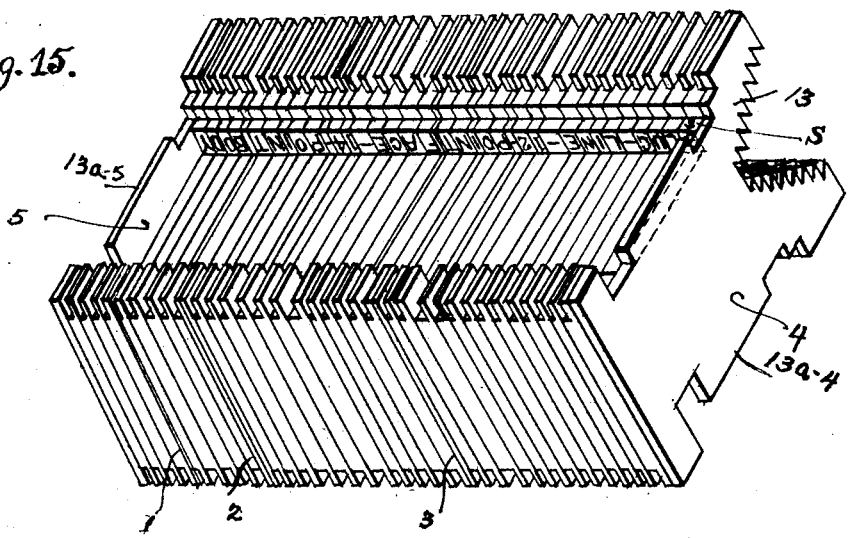

April 14, 1931. R. EMERY 1,801,075
TYPOGRAPHICAL MOLD ELEMENT
Filed Dec. 1, 1926  4 Sheets-Sheet 1
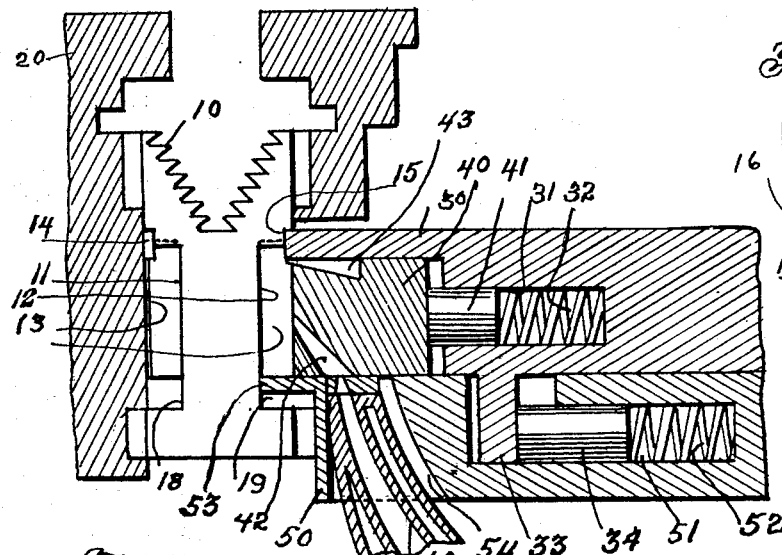
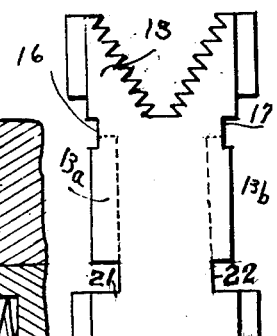
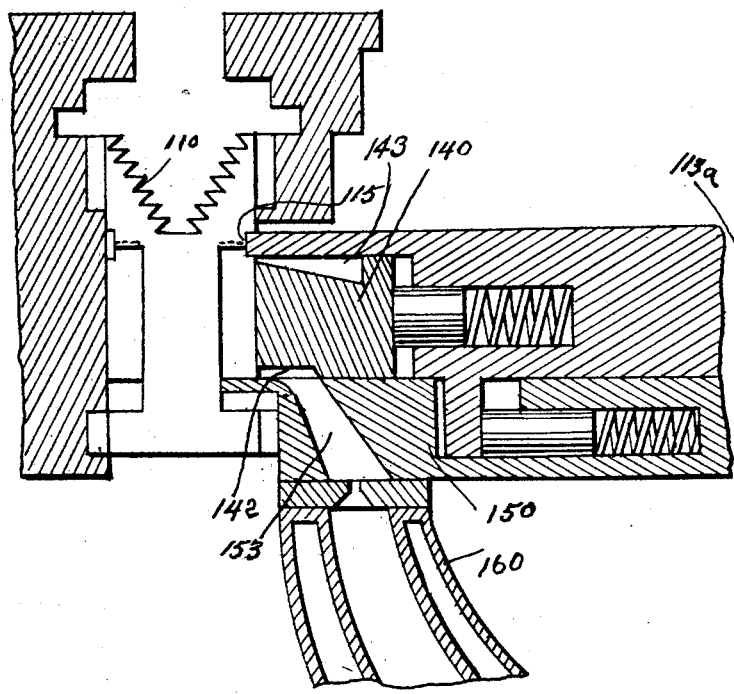
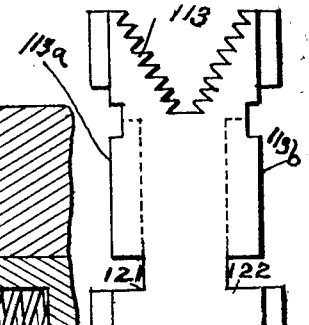
INVENTOR
Roy Emery
BY
Charles F. Wilcox
HIS ATTORNEY April 14, 1931.    R. EMERY    1,801,075
TYPOGRAPHICAL MOLD ELEMENT
Filed Dec. 1, 1926    4 Sheets-Sheet 2
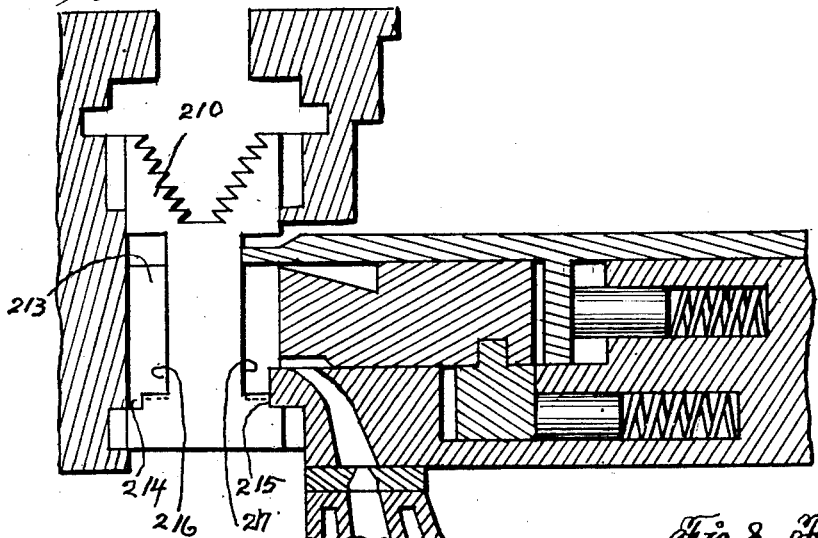
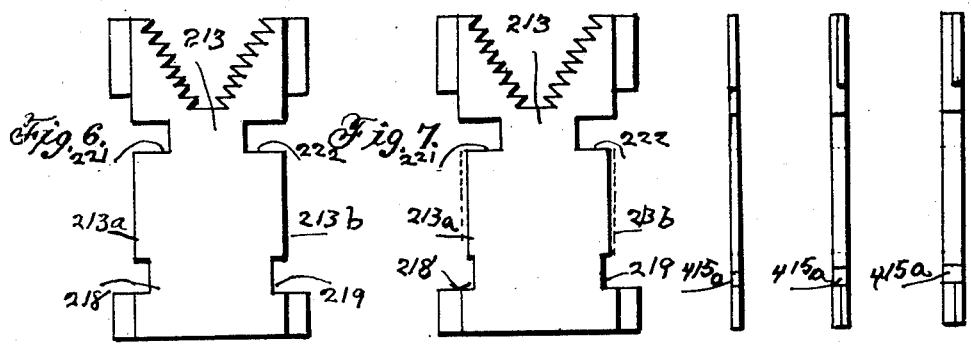
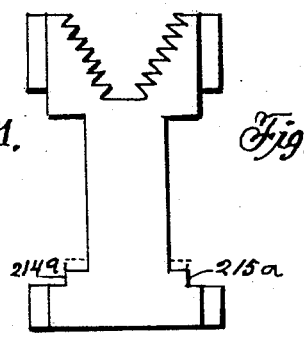
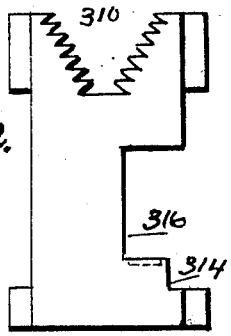
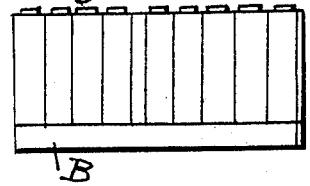
INVENTOR
Roy Emery
BY
Charles P. Wilcox
HIS ATTORNEY April 14, 1931.  R. EMERY  1,801,075
TYPOGRAPHICAL MOLD ELEMENT
Filed Dec. 1, 1926  4 Sheets—Sheet 3

INVENTOR
Roy Emery
BY
Charles P. Wilcox
HIS ATTORNEY

April 14, 1931. R. EMERY 1,801,075
TYPOGRAPHICAL MOLD ELEMENT
Filed Dec. 1, 1926  4 Sheets-Sheet 4
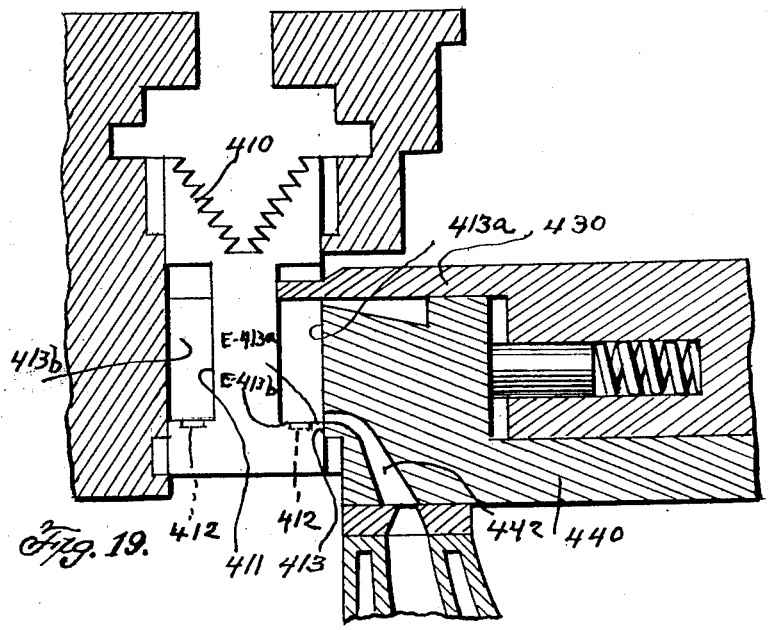
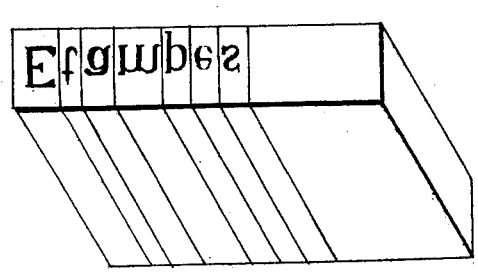
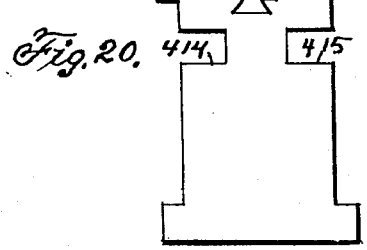
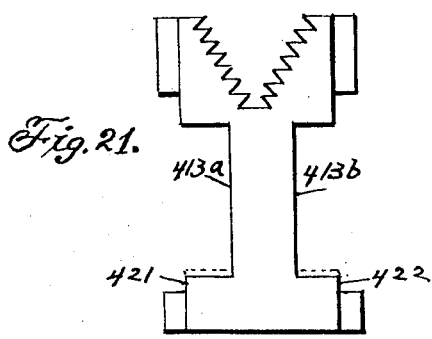
INVENTOR
Roy Emery
BY Charles F. Wilcox,
HIS ATTORNEY Patented Apr. 14, 1931

1,801,075

UNITED STATES PATENT OFFICE

ROY EMERY, OF BROOKLYN, NEW YORK

TYPOGRAPHICAL-MOLD ELEMENT

Application filed December 1, 1926. Serial No. 152,025.

This invention relates to typographical machines, and more particularly to molding elements from which type characters are cast which are adapted for being circulated in series through the class of typographical machines which employ circulating matrices for composing type in lines and casting slugs or lines of type on a body; also to the product of my improvement in such typographical machines and molding elements.

The object of my invention is to provide improved molding elements whereby the product thereof will be adapted to meet certain needs and requirements of the typographer's craft not otherwise attainable, in that by means of my improvements in molding elements, type may be cast in slug lines, divided slug lines, single words or other groups upon separate body or single letters or character may be cast upon single body; and said elements may be cast upon type body of variable dimensions as, for example, 10 point type may be cast upon 14 point body or 16 or 18 point body, either in slug lines, divided slugs, words, groups of characters or single type.

A further object of my invention is to provide suitable spacing elements for spacing and justifying a line of type of the character cast in my improved molding elements, whether the type is cast as slug lines, divided slugs, words, groups of characters or single type, so that when the line composed and cast is set in a form the lines thereof will be properly justified, and the product be immediately available for printing in a press or for such other use as may be desired.

A further object is to provide molding elements whereby the type metal may be inserted into the molding elements at a point adjacent the type face, or strike, thus preventing the metal from becoming partly cooled before the character matrix is filled.

A further object is to provide means for eliminating air bubbles from the type elements cast in the mold elements herein described and shown.

A further object is to provide means for casting the type elements herein described upon a base or as a type comb in which the type elements are disposed in the order in which they are to be employed for printing or stenciling or other use so that when the base, or tang, is removed the separate units of the comb may be resolved into a justified line ready for use, all disposed in their proper order, without resetting or justifying.

A further object is to provide molding elements of the character described whereby a body extension may be cast above or below the type face.

A further object is to provide molding elements for type units of the character described in which type characters of extra large size may be cast but which may be the same size and general outline as matrices now commonly used in slug casting machines.

A further object is to provide molding elements adapted to serve as spacers for justifying either in slug-lines, divided slug-lines, lines of word units or units of other groups of characters or lines of single characters or lines of composite or mixed character units.

And a still further object is to provide division walls for separating slug-lines into variable units, as divided slugs, words, units of other groups of characters, or single characters.

And a still further object is to provide spacing elements and division walls of variable thickness, or of different thicknesses whereby any line may be perfectly justified so that when the sum of the several thicknesses of the spacing elements and the division walls is deducted from the line set, the remaining units will properly justify as a line.

Figure 16:
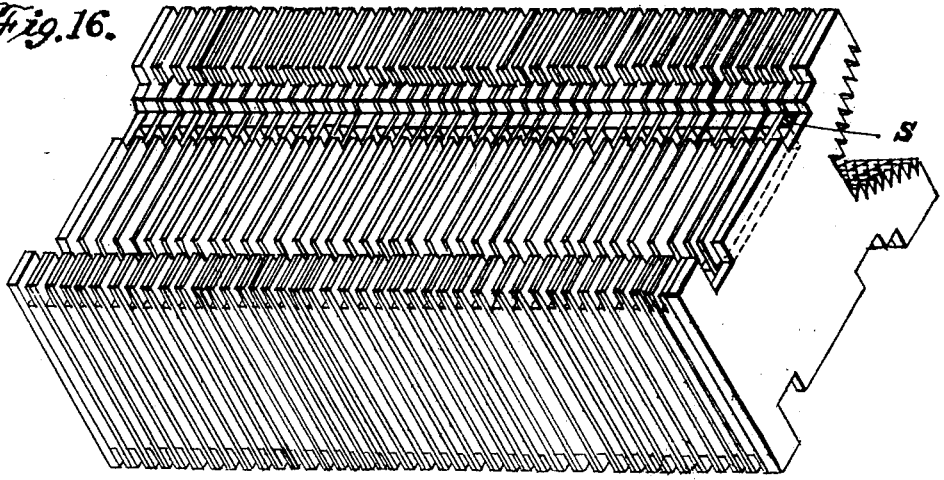
Figure 17:
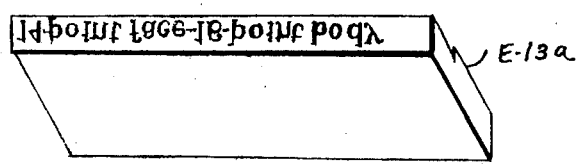
Figure 18:
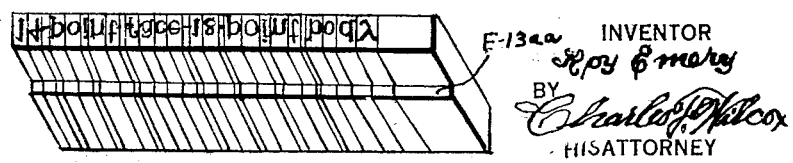

With these and other objects in view reference may be had to the accompanying drawings forming a part of this specification, in which Fig. 1 is a sectional view of the casting chamber of a typographical machine together with parts of the molding and casting mechanism with one matrix of a composed line shown in position for casting; Fig. 2 is a view of one of the division walls adapted for forming an extension of two points upon the body below the face; Fig. 3 is sectional view similar to that shown in Fig. 1 showing a modified form of the molding and casting mechanism; Fig. 4 is a view of one of the division walls adapted for forming an extension of four points upon the body below the face of the type; Fig. 5 is a sectional view similar to Figs. 1 and 3 showing a further modification of the molding and casting mechanism in which an extension may be cast upon the type body above the face of the type; Fig. 6 is a view of one of the division walls adapted for forming an extension of four points upon the type body above the face of the type; Fig. 7 is a view of one of the division walls adapted for forming an extension of two points upon the type body above the face of the type; Fig. 8 is a view of one of the division walls showing the thickness of one style of division walls; Fig. 9 is a view of one of the division walls of greater thickness than shown in Fig. 8; Fig. 10 is a view showing one of the division walls of still greater thickness than shown in Fig. 9; Fig. 11 is a view of one of the spacing elements, which may be made in any dimension as to its thickness; Fig. 12 is a view of one of the matrices which may be employed for casting extra large type characters without increasing the length or breadth of the matrices in which a shorter type body is cast; Fig. 13 is a view showing the type face of the product cast by means of the style of matrices shown in Fig. 12; Fig. 14 is a view showing a line of type, as illustrated in Fig. 13, as set in a form for printing and superposed upon a base to give it the required height for printing in a standard press; Fig. 15 is an isometric perspective view showing a set of matrices of the kind shown in Figs. 1, 2, 3 and 4 of the drawings, composed in order for casting a justified slug-line of type, reading: "slug-line—12 point face—14 point body"; Fig. 16 is an isometric perspective view showing a set of matrices of the kind shown in Fig. 15 composed in order for casting a justified line of single type reading the same as the line shown in Fig. 15; Fig. 17 is a view of a slug-line cast in my improved molding elements with a two point body extension below the face of the type; Fig. 18 is a single type line with a four point body extension above the face of the type; Fig. 19 is a sectional view showing a modified form of the matrix and the molding elements adapted to coact therewith, in which it is possible to cast type with a body extension above the capital letters, for special accents, as in certain foreign languages; Fig. 20 is a view of a wall designed to be used with the form of matrix shown in Fig. 19; Fig. 21 is a view of a spacing matrix adapted to be used with the matrix shown in Fig. 19 and the spacing matrix shown in Fig. 20, and Fig. 22 is a view of the product cast as single type with the forms of molding elements shown in Figs. 19, 20 and 21 of the drawings.

This invention, in principle, is within the scope of my Letters Patent, of the United States, issued on the 16th day of November, 1926, for mold elements for casting justified lines of single type, logo-types, words, divided slugs and type bars, bars, filed Sept. 14, 1922, Serial Number 588,281, Patent Number 1,607,252, and embodies to a great degree the same elements as contained and embodied in my said patent.

This invention, in principle, is also within the scope of my pending application for Letters Patent, of the United States for typographical mold, Serial No. 135,976, filed September 16, 1926.

Referring to the drawings, Fig. 1 shows a matrix 10 in the casting position in the elevator 20. Recesses 11 and 12 are for casting the type, and beyond the matrix through said recesses are disclosed the dividing wall 13, for separating the type units cast, which dividing walls are more fully shown in Figs. 2 and 4 of the drawings.

Recesses 14 and 15 are provided in the matrices, of a depth to determine and limit the depth of the type cast in the matrices and corresponding recesses 16 and 17 are provided in the dividing walls. At the lower portion of the matrices are recesses 18 and 19 for admitting parts of the casting mechanism and corresponding recesses 21 and 22. Between the recesses 16 and 21 and the recesses 17 and 22 are extensions of the wall of a variable width, extending beyond the recesses 16 and 17. In the casting operation there is a plate of the casting mechanism, 30 which is moved by mechanism not shown, into the position indicated in Fig. 1, which member has a predetermined position at all times when casting a type of a determined size, and always fits closely in the recess as 15 adjacent the strike of the matrix. Upon the plate 30 is yieldingly held a molding element 40, which forms one surface of the type units cast. A recess or plurality of recesses, as 31, may be provided in the plate 30, and a spring as 32, is disposed therein. Corresponding pins as 41 may be provided upon the molding element 40 which are disposed in the recesses as 31. The plate 30 has an extension 33, and a pin or pins as 34 may be provided therein which are disposed in a recess or recesses as 51 in the plate 50, and a spring as 52 is disposed in said recess or recesses for engaging said pin 34 which serves to yieldingly hold the element 40 in contact with the edges or extensions 13a and 13b of the dividing walls 13. It will be seen that the said extensions 13a and 13b as shown in Figs. 1 and 2, are narrower than the matrix, and the type units or bodies cast when walls are used having extensions of the width shown in Figs. 1 and 2, are smaller than the bodies cast when wall having extensions of the width shown in Figs. 3 and 4 are used. The yielding bearings of the element 40 admit of the adjustment of said element in accordance with the variation of the extensions described. It will be obvious that the extensions of all the walls used with one size of type must be equal. When a larger size of type is to be used, or where it is desired to produce type with the same size of face on a larger body, i. e., leaded type, the wall with greater extensions must be employed, as for example, as shown, in Figs. 3 and 4 of the drawings. The plate 50 is provided with an extension 53 which is disposed within the recess as 19, of the matrix, and is mechanically moved to and from the casting position by means not shown. And when in the casting position, the plate 30 and the element 40, by means of the spring mechanism described are forced into the proper position, in contact with the matrices and division walls, regardless of the variation in depth of the recess as 15, or the extension as 13b.

In the form shown in Fig. 1, a recess 54 is provided for the mouth of the metal pot 60.

In the molding element 40 an inlet, as 42 is provided for admitting molten metal for casting type, and a second recess 43 is provided near the upper portion thereof for the escape of air, so that bubbles will not form in the metal entering the strike of the matrix, but will escape into the recess 43 in which a tang will be cast which also serves to bind the separate type units together until it is removed. In like manner a tang is formed in the inlet 42 which serves a similar purpose. These tangs must be removed before the product is ready for use if cast in the form of a slug line, or if cast as single type, the tangs must be removed and the individual type units are brought together forming a line, as indicated in Fig. 18 of the drawings.

A modified form of the casting mechanism of the molding elements is shown in Fig. 3. In Fig. 3 the matrix 110 employed is the same as the matrix 10 shown in Fig. 1, but the dividing wall as 113, has larger extensions, as 113a and 113b, extending to the full width of the matrix 100, so that a greater body extension will be cast upon the type than when the form of dividing wall shown in Figures 1 and 2 are used. It will be obvious that any required variation in the extent of the body and size of type can be obtained by varying the recess as 15 and 115, and the extensions as 13a and 13b, and 113a, 113b as indicated. In the form shown in Fig. 3, the inlet for the metal is of a modified form. The element 140 having a recess as 142 in its lower surface, which recess is elongated, that it will communicate with the inlet in the member 150 although in different positions of adjustment. The member 150 is provided with an inlet as 153 which has an elongated or slot-like inlet and outlet, so that there will be a free flow of metal from the inlet 153 into the recess 142 of the element 140, and a free flow of metal from the nozzle of the metal pot, as 160, into the inlet, in whatever position of adjustment the parts may relatively be.

The dotted line in Figs. 2 and 4 indicate the corresponding recesses of the matrices wherein the type is molded and illustrate the different size of the body extensions that may be cast therewith.

In Fig. 5 of the drawings a further modification of the form of my invention is shown. In this form of molding elements the type is molded so that the extension upon the body of the type may be above the letters whereas it is below when molded in the molding elements shown in the forms hereinbefore described. This is attained by forming the matrices with the characters or "strike" in the lower part of the matrices instead of the upper part as shown in Figs. 1 and 3 and the type is cast in an inverted position.

In Fig. 5 210 indicates a matrix, having recesses as 214, 215, and larger recesses for the type body as 216 and 217. The dividing walls used, as 213, have corresponding recesses as 218 and 219 at the lower part thereof and recesses 221 and 222 at the upper part thereof, and between the recesses 218 and 221 is an extension 213a and between the recesses 219 and 222 is an extension 213b. These extensions will vary in size in accordance with the size of the extension to be provided upon the product.

In Fig. 6 of the drawings the extensions on the wall extend the full width of the matrix, while in Fig. 7 the extensions are less as indicated by the dotted lines.

In Figs. 8 to 10 inclusive spacers of different thickness are shown indicating that a line may be justified by proper disposition of the spacers of different thickness so that when a line of either single characters or a slug line or a line of divided slugs is molded, it is possible by computing the space to be occupied by the characters in the line spacing matrices may be introduced at proper places thus justifying the line. If single type characters are being cast, dividing walls are introduced and allowance for the additional thickness of the dividing walls used must be made and the line accordingly lengthened when being set, then the deduction being made for the thickness of all the dividing walls, the line will justify.

A flat view of one of the spacers is shown in Fig. 11 and the dotted lines indicate that the shoulder, as 214a and 215a may be made any desired height so that the top of the space metal will be flush with the shoulder of the character type unit or lower.

I wish to say here, that I am not limited to the use of the spacing matrices described herein for justifying the lines molded by my method but have made provision for justifying the product in the pending application above mentioned and in the patent above mentioned granted me on the 16th day of November, 1926, which justifying means are adapted for use in connection with the forms of molding elements herein described and shown.

In Figs. 12, 13 and 14 of the drawings I have shown a modified form of a matrix, in which a type of large size may be cast using a matrix of standard size. The matrix 310 has a recess at its lower portion, as 314, corresponding with the recesses 214 and 215 shown in Fig. 5 of the drawings. Another recess 316 is provided in which the body of the type is molded. This recess is of great depth, in the horizontal or lateral dimension, but not so long from the top to the bottom in the vertical or longitudinal dimension, as it will be seen that if it were as long from top to bottom as the recess in the matrix shown in Figs. 5 and 11, there would not be left enough metal to afford the required strength for the matrix. For a similar reason the recess is provided on one side only of the matrix, because, two of such recesses would approximately meet in the center lines of the matrix and leave no metal to connect the upper and lower portions of the matrix. To provide a large type by means of my molding elements, which will embody all the advantageous features of the smaller type so molded, I first cast a type with shorter or lower body, in the style of matrices described, and this type is superposed upon a base, preferably produced by casting plain type metal slugs, of substantially 16 point thickness, which when laid flat upon its side, will afford a suitable base, and add the required dimension to the height of the short type body cast in the large type matrices. Dividing walls of the same character as described, may be employed and the product be cast as single character type, as shown in Figs. 13 and 14 of the drawings. In Fig. 13 shows the words "Short body" as set and molded by this method, and Fig. 14 shows the single type units superposed upon a slug base of substantially 16 points, indicated as B.

In Fig. 15 is shown in perspective, a composed line of matrices, with spacing matrices between the character matrices, which will cast a line as: "Slug-line—12-point face—14-point body". It is assumed that the line is properly justified, by spacing matrices, of required thickness, indicated as 1, 2 and 3.

In this line only two dividing walls are employed, one at each end of the line, as 4, and 5, and it is obvious that the extensions, thereon, as 13a—4 and 13a—5 when the adjustable molding elements of the casting mechanism are in position, so as to engage within the recesses and against the said extensions, that the product will be molded in the form of a slug with the characters of the matrices as described thereon, and having an extension E—13a, thereon as shown in the product shown in Fig. 17.

In Fig. 16 is a perspective view which may be assumed to represent the same characters as shown in Fig. 15, but the dividing walls interposed between the character matrices prevent clearly delineating the characters, upon the shoulders of the matrices therebetween, and for that reason the characters are omitted from this figure. I will be very clear how each character will be cast upon a separate body, in this mold and when arranged in line and when the tangs hereinbefore described, are removed, the single type characters will form a line similar to that shown in Fig. 18 with the extensions thereon, E—13aa.

To designate the matrices by character an indicator as "s" may be stamped in the shoulder thereof above the strike, as shown on the first matrix in Fig. 15 and Fig. 16 of the drawings.

With further reference to Fig. 17, the figure shows a slug line with the words and figures as follows: "14-point face—16-point body". And Fig. 18 shows a line of single type with corresponding extensions thereon reading: "14-point face—18-point body". Both of these last mentioned figures represent the product of my molding elements and method of casting type herein described.

Still further modifications of my molding elements and method of casting type and the product thereof, is shown in Figs. 19 to 22 inclusive.

In Fig. 19 is shown a form of matrix whereby a type body can be cast of greater dimensions than the type face, with an extension above the type character as well as below, so that space is provided upon the body above the capitals for special accent marks, which are used in some foreign languages.

In this form of my molding elements the matrix 410 has the character cut in the matrix at a spaced distance from the wall 411 of the recess as at 412, indicated by dotted lines, and the adjustable molding element as 440 impinges against the shoulder 413 of the matrix, and the edge of the division wall 413a so that the body of the type will be of equal thickness from top to bottom. Thus a space for the metal of the body extension, as E—413a and E—413b, are provided above and below the strike thus producing type of the character indicated in Figure 22, in which the word 'Étampes' is molded, there being space below the type character for the stem of the "p" and space above the capital for the special accent over the "E".

The inlet 442 to the molding chamber is entirely through the element 440, and the third member of the molding mechanism shown in the other figures is dispensed with.

The division wall is shown in Fig. 20, and has only the recesses 414 and 415 at the upper portion thereof which admit the molding plate 430.

The spacing matrix is shown in Figure 21 having the recesses, 413a and 413b. The shoulders 421 and 422 may be of any required height, so as to form a top surface on the same plane with the shoulder of the type body or on a lower level. This is regulated by the height of the shoulder as indicated by the dotted lines in the figure. Figure 22 indicates a line of single type characters on an enlarged scale, but the line might be made as a solid slug by omitting the dividing walls in setting.

While I have specifically described certain forms of my invention shown in the drawings forming a part of this specification, I do not wish to be limited to the specific forms shown and described, but reserve the right to depart therefrom within the spirit and scope of my invention, as set forth in the statement of objects of my invention herein.

Having thus described my invention, what I claim as new therein and desire to secure by Letters Patent of the United States, is:

1. A composite mold for casting justified, integral lines of type, comprising matrix elements, spacing elements, an adjustable body block, an adjustable foot plate, and an adjustable top plate.

2. A composite mold for casting justified, divided lines of type, comprising matrix elements, spacing elements, walls, an adjustable body block, an adjustable foot plate, and an adjustable top plate.

3. A composite mold for casting justified, integral lines of type, comprising matrix elements, spacing elements, an adjustable body block, and an adjustable foot plate.

4. A composite mold for casting justified, divided lines of type, comprising matrix elements, spacing elements, walls, an adjustable body block and an adjustable foot plate.

5. In a typographical mold adapted to cast solid type, means for casting leaded type, comprising wall elements with extensions thereon, a body block, and means to adapt said body block to said extensions.

6. A composite mold adaptable to cast justified lines of type integrally or divided, solid or leaded, and with high or low spaces, the length of line and said other conditions being determined solely by the selection of elements composing it, said elements comprising, matrix elements, space elements, and walls, used in combination with an adjustable body block and an adjustable foot plate.

7. In a composite typographical mold, a wall element, the body-wise dimension of which exceeds the body-wise dimension of matrix or space elements used in combination therewith.

8. A composite mold for casting justified lines of leaded type, comprising matrix elements, spacing elements, walls having extensions larger than the body size of said elements, an adjustable body block whose position is determined by said wall extensions, and an adjustable foot plate whose position is determined by the location of the back wall of said matrix elements.

9. A mold for casting type with an extension on the body, comprising a matrix element for forming the top and one side of the body, walls for forming two other sides which have extensions beyond the recess of the matrix element, a foot plate adjustable to the matrix, and a body block adjustable to said walls for forming the fourth side.

10. In a typographical mold, a body block having a surface for forming one side of the type, a recess for forming a tang near the foot of the type, and a recess for forming a tang near the face of the type.

11. In a typographical mold, a body block having a surface for forming one side of the type, a recess for forming a tang near the foot of the type, and a recess for forming a tang near the face of the type, said block being adapted to slide toward the mold cell and to be yieldingly held thereagainst.

12. In a typographical mold, a cavity for casting a tang, a cavity for casting type, and a cavity for casting another tang from metal which has passed through the two other cavities.

ROY EMERY.